United States Patent [19]

Tharpe et al.

[11] 3,822,590
[45] July 9, 1974

[54] TEXTILE SLIVER UNEVENNESS DETECTING

[75] Inventors: James B. Tharpe, Taylors; Christoph W. Aurich, Clemson; Joseph B. Wallace, Greenville, all of S.C.

[73] Assignee: Maremont Corporation, Chicago, Ill.

[22] Filed: May 1, 1972

[21] Appl. No.: 249,292

[52] U.S. Cl. .................................. 73/160, 19/240
[51] Int. Cl. .............................................. D01h 5/32
[58] Field of Search ...... 73/159, 160, 141 A; 28/64; 19/239, 240

[56] References Cited
UNITED STATES PATENTS
T886,007   5/1971   Harvey et al. ............... 73/88.5 R
FOREIGN PATENTS OR APPLICATIONS
158,684   11/1963   U.S.S.R. ....................... 73/141 A

*Primary Examiner*—Donald O. Woodiel

[57] ABSTRACT

Method and apparatus for automatically reducing variations in the mass of moving staple fiber sliver including a novel textile fiber unevenness detector comprising a plurality of opposing members joined at one end so as to provide therebetween an enclosed passageway, wherein at least one of said members is inwardly and resiliently biased and bears a strain gage responsive to the outward displacement of the member for providing an electrical signal proportional thereto, whereby a textile fiber strand passing through the passageway displaces the unjoined end of the member outwardly thereof against the inward resilient bias thereof in proportion to the thickness and thus the instantaneous mass of the strand. The strain gage provides an electrical signal also proportional to the displacement. The invention also provides evening apparatus for continuously evening the mass of the moving fiber strand and presenting it to a drawing frame at uniform velocity including electrical and mechanical actuation means responsive to the electrical output signal of the unevenness detecting device.

18 Claims, 10 Drawing Figures

TEXTILE SLIVER UNEVENNESS DETECTING

BACKGROUND OF THE INVENTION

This invention relates to control means for textile drafting apparatus and more particularly to methods and apparatus for automatically reducing variations in the mass of staple fiber sliver, such as in connection with textile spinning, roving or drawing frames, coilers and especially in apparatus in which staple fiber sliver is continuously delivered to a high speed draw frame.

Modern automated staple fiber handling systems are capable of continuously producing and drafting a sliver at high speed, such as 1,200–1,600 feet of sliver per minute, at which speeds the inertia of the draw frame rolls and their driving mechanisms are so great as to make it impractical if not impossible to deal with relatively short term changes in sliver mass, hereinafter called "variations," by changing draw frame roll speeds, although long term variations in sliver mass can so be taken care of. By "short term" variations is meant, according to the invention, changes in mass of sliver per unit sliver length from one short length to another short length along the sliver strand. Such "short lengths" of sliver are commonly of the order of 3 to 25 inches. "Very short term" variations are less than 3 inches. "Long term" variations are those of sliver mass which change along the sliver strand at lengths of more than 25 inches per measurable mass variation. For this reason, it is desirable to provide a sliver delivery to the draw frame at constant speed, insofar as short term sliver mass variations are concerned, so that any sliver evening mechanism arranged with its delivery directly feeding into a draw frame must provide such delivery at constant speed. However, although constant speed delivery evening mechanisms are known in the art, they have proved to be deficient in their ability to deal with extremely short variations, of the order of a few inches at the necessary high speeds, primarily because of deficiencies as to the sensitivity, response time and stability of their unevenness detecting means in signalling an unevenness correcting mechanism commonly called an "evening" mechanism.

OBJECTS OF THE INVENTION

Accordingly, it is a major object of the present invention to provide a novel sliver unevenness detecting device for sensing variations in sliver mass from length to length therealong as it moves and adapted to cooperate with the variable speed input rolls of an evening mechanism to produce improved evening.

It is another object of the invention to provide an unevenness detecting device for cooperation with an evening mechanism having continuous and direct sliver delivery to a textile machine, such as a draw frame, to provide sliver evening capable of dealing with very short term sliver mass variations at high speed, as well as short and long term variations.

SUMMARY OF THE INVENTION

Accordingly, the present invention provides a novel textile fiber unevenness detecting means comprising a plurality of opposing members joined at one end so as to provide therebetween an enclosed passageway, wherein at least one of said members is inwardly and resiliently biased and bears adjacent said one end strain gage means responsive to the outward displacement of said member for providing an electrical signal proportional thereto, whereby a textile fiber strand passing through said passageway displaces the unjoined end of said member outwardly thereof against said inward resilient bias thereof in proportion to the thickness of said strand and therewith said strain gage means provides an electrical signal also proportional thereto.

In a preferred embodiment, said unevenness detecting means preferably comprises a body having two faces with concave surfaces which cooperate with a roll pair and terminate in parallel spaced, axially extending edges providing fixed axially extending sliver thickness confining surfaces therebetween. A pair of sliver width confining surfaces, preferably in the form of opposed flexible members, are mounted on the base between the axially extending sliver confining surfaces and generally perpendicular thereto, at least one of the sliver width confining surfaces being movably mounted on the base and resiliently urged in an inward direction to a position to confine a sliver in conformance with widthwise variations therein. There are provided sensing means responsive to the displacement position of the movably mounted sliver width confining surface, preferably in the form of strain gages mounted on the flexible members providing an output signal responsive to displacement bending of said members and to the displacement positions of the sliver width confining surfaces.

The present invention in combination with said unevenness detecting means also provides evening apparatus for continuously evening the volume of a moving multifiber strand and presenting it to said drawing frame at uniform velocity. In general, such evening apparatus comprises an evening drafting element including a pair of delivery rolls and a pair of input rolls for evening the strand therebetween, and driving means for the drafting element rolls including differential drive means, power means for driving the delivery rolls at uniform speed and for driving one driving input of the differential drive means and control means responsive to the sliver unevenness detecting device output or "correcting" signal for driving the other input of the differential drive means to vary the speed of the input rolls responsive to sliver variations.

The evening drafting element, driving means for the drafting element rolls, power means for driving the delivery rolls and differential drive means, and control means together comprise electrical and mechanical actuation means for providing a physical response proportional to the electrical output signal of the unevenness detecting device.

DRAWINGS

For the purpose of explaining the above and further objects and features of the invention, reference is now made to the following detailed description of preferred embodiments of the invention, together with the accompanying drawings, wherein.

PREFERRED EMBODIMENTS

Figure 1:
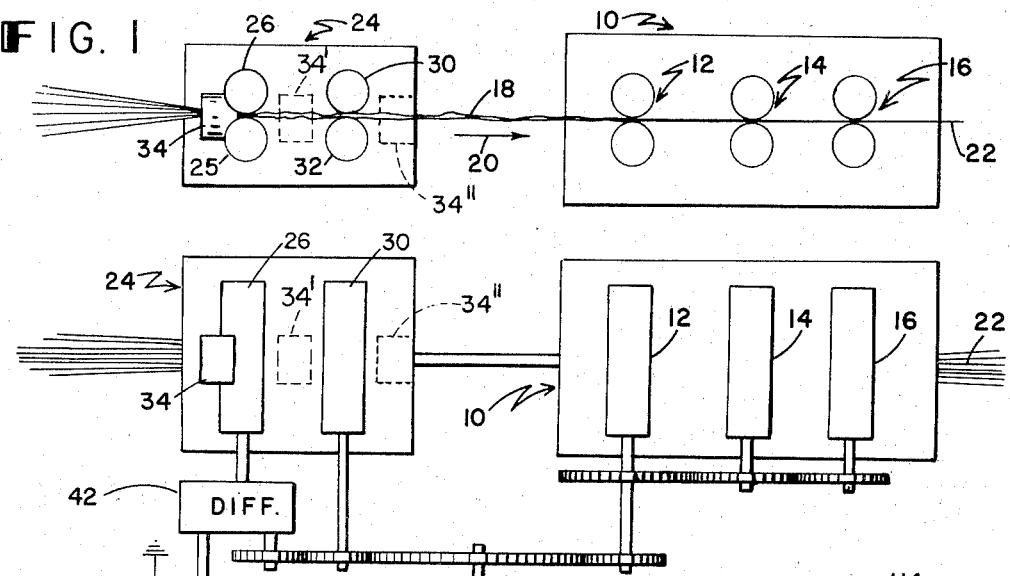
FIG. 1 is a schematic side view of apparatus according to the invention including a drafting frame and evening mechanism.
Figure 2:
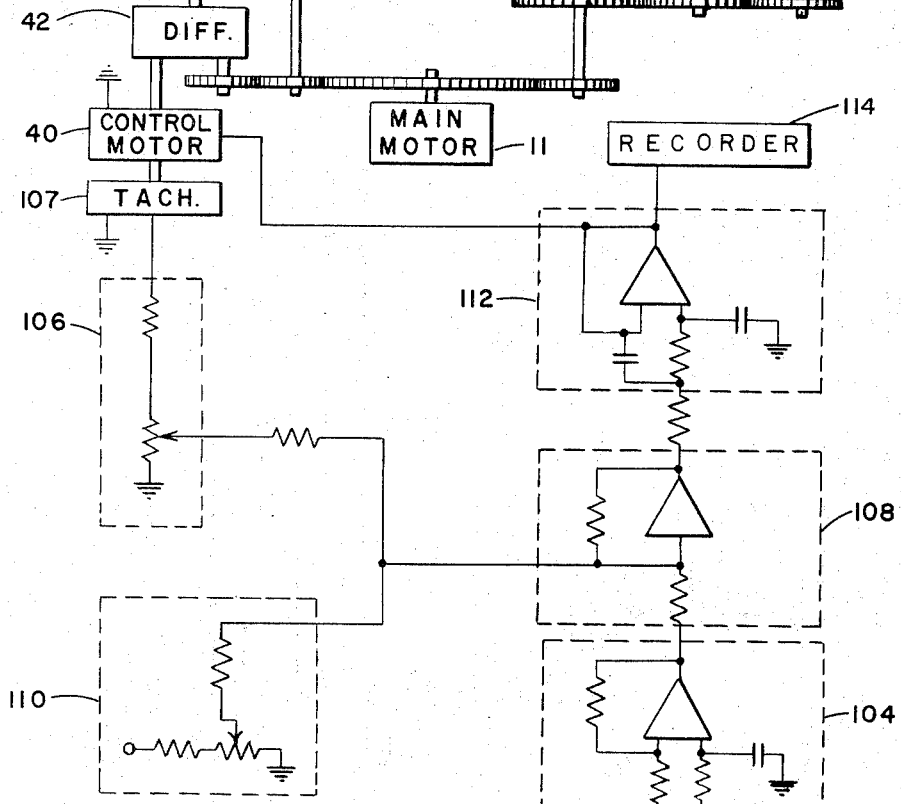
FIG. 2 is a schematic top view of the apparatus of FIG. 1 including its circuit diagram and its operating elements.

Referring now to the drawings, and particularly to FIGS. 1 and 2, there is shown a high speed draw frame, generally designated 10, having three pairs of drafting rolls 12, 14 and 16 rotated by main motor 11 through suitable gears at increasing speeds selected in a manner well understood in the art to provide the desired draft. A single sliver 18 is fed to the drafting rolls in the direction indicated by arrow 20, and the drafted sliver is removed at 22.

According to one embodiment of the present invention, there is provided, in combination with draw frame 10 for direct sliver delivery thereto at constant speed, an evening mechanism, generally designated 24. Said evening mechanism has a front or input pair of rolls 25 and 26, spaced at an adjustably fixed distance from one another to provide a sliver nip therebetween and rotated at a variable speed through differential mechanism 42 by main motor 11 and otherwise as hereinafter explained and a rear pair of adjustably fixed rolls 30 and 32, rotated by main motor 11 through suitable gears at constant speed generally equal to or slightly less than that of roll pair 12 on drawing frame 10. A novel sliver unevenness detecting device of the invention, generally designated 34 and hereafter more fully described is preferably positioned immediately before the front pair of evening rolls 25, 26 so that the sliver is fed through the device to evening mechanism 24.

Referring to FIGS. 1 and 2, in alternate dispositions of the apparatus, the unevenness detecting device may be placed after rear rolls 30 and 32 of evening mechanism 24, as shown at 34'', so that the thickness of the textile strand may be changed before it enters detecting device 34'', or the device, as shown at 34', may be placed intermediate roll pairs 25, 26 and 30, 32 to detect sliver variations thereat and whereby the thickness of the textile strand may be changed while the strand is passing through device 34'. The aforesaid are preferred embodiments usefully employed with draw frames 10 of any speed up to and including extremely high speed draw frames. Yet another alternative is to place evening mechanism 24 containing detecting device 34 or 34'' downstream of draw frame 10 so as to effect evening of drafted sliver. The invention also contemplates using drafting roll pairs 14 and 16 of draw frame 10 as functional substitutes of roll pairs 25, 26 and 30, 32 by placing device 34 intermediate rolls 12 and 14 or device 34' intermediate rolls 14 and 16 or device 34'' downstream of rolls 16; therein, roll pairs 25, 26 and 30, 32 would be completely eliminated, the differential 42 being now interconnected to roll pairs 14 and 12, and the main motor 11 now being connected to roll pair 16, which latter delivers sliver at a constant speed rate.

Figure 3:
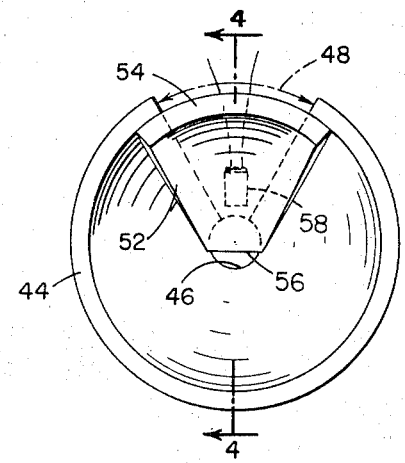
FIGS. 3 and 4 are, respectively, a front view and a side sectional view of a first embodiment of a sliver unevenness detecting device of the invention.
Figure 4:
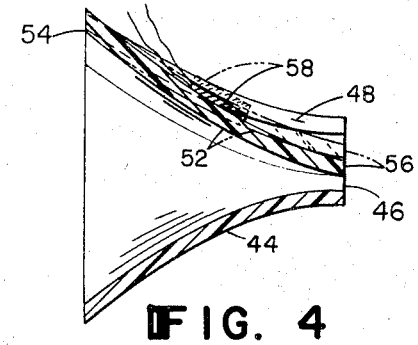

Referring now to FIGS. 3 and 4, the unevenness detecting device thereof includes a funnel shaped body 44 with a central exit opening 46 and a segmental opening indicated as a segmental arrow 48 extending from said exit opening. A generally triangular inwardly and resiliently biased movable leaf 52, having its large end 54 mounted adjacent the outer edge of body 44 on each side of segmental opening 48 underlies said segmental opening 48 and has its free end 56 spaced inwardly toward the exit opening 46 of body 44. Body 44 and leaf 52 thus provide a pair of opposing members joined at one end with their opposite ends providing therebetween an enclosed passageway through which a mass of sliver passes for measurement of its mass.

For measuring the position of leaf 52 and hence the mass of sliver in exit opening 46, movable leaf 52 carries strain gage 58. Such strain gages are of the resistance type, well known in the art, and are bonded to said leaf by known bonding techniques for measuring the bending and hence the position of the sliver confining leaf 52 in conformance with instantaneous sliver mass variations as the sliver passes through exit opening 46 past the free end 56 of said leaf. Circuitry for said strain gages is well known in the art, and will be described later herein in connection with FIG. 2.

Figure 5:
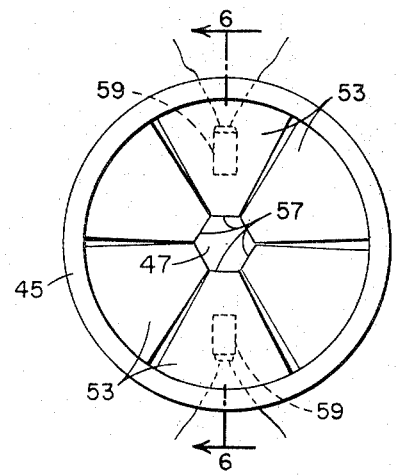
FIGS. 5 and 6 are, respectively, a front view and a side sectional view of a second embodiment of a sliver unevenness detecting device of the invention.
Figure 6:
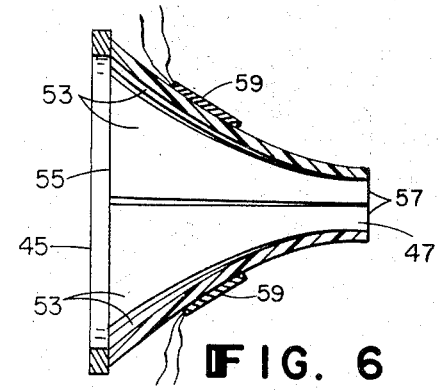
Figure 8:
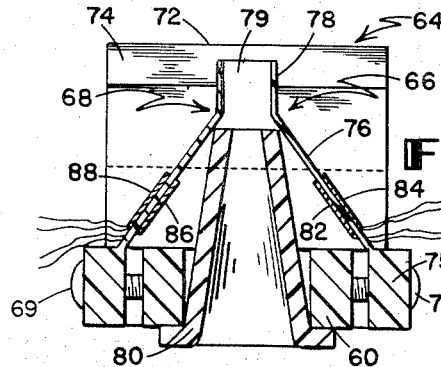
FIG. 8 is a horizontal cross-section of the sliver unevenness detecting device of FIG. 7 taken on the line 8—8 thereof.
Figure 7:
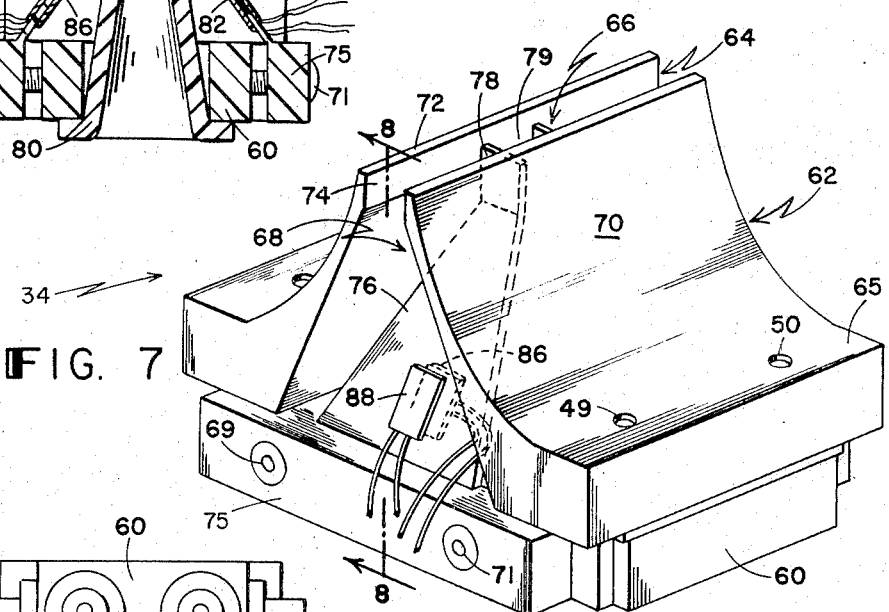
FIG. 7 is a detailed perspective view of a third embodiment of the sliver unevenness detecting device of the invention.
Figure 9:
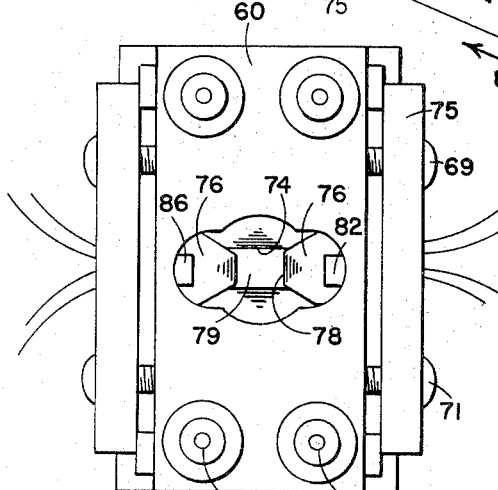
FIG. 9 is a front view of the sliver unevenness detecting device of FIG. 7, a portion being removed for clarity.

Referring now to FIGS. 5 and 6, another embodiment of the unevenness detecting device of the invention as shown therein includes a mounting ring 45, six generally triangular inwardly and resiliently biased movable leaf segments 53, having their large ends 55 fixedly mounted on ring 45 and extending generally axially and inwardly with their free and unjoined ends 57 resiliently abutting one another at the side edges thereof, together providing a funnel shaped body having an exit opening 47. Leaves 53 thus again provide opposing members joined at one end with their opposite ends providing therebetween an enclosed passageway through which a mass of sliver passes for measurement of its length to length variations therealong.

For measuring the position of leaves 53 and hence the mass of sliver in exit opening 47, preferably at least two opposite ones of said movable leaves 53 carry strain gages 59, bonded to said leaves for measuring the bending and hence the position of said leaves in conformance with instantaneous sliver mass variations as the sliver passes through exit opening 47 past the free ends 57 of said leaves.

Figure 10:
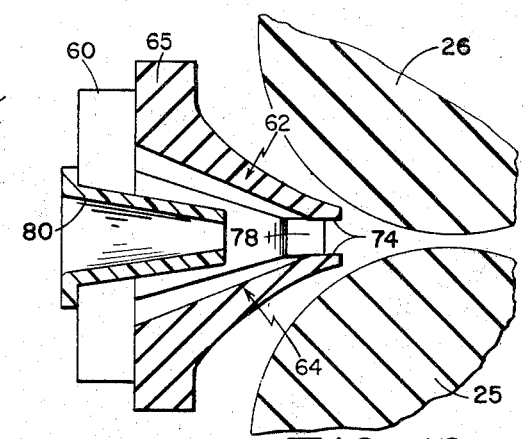
FIG. 10 is a side cross-section of the unevenness device of FIG. 7 showing its cooperation with the input rolls of the evening mechanism.

Referring now particularly to FIGS. 7, 8, 9 and 10, still another embodiment of the sliver unevenness detecting device of the invention therein shown forms a generally truncated pyramidal passageway, and has a base 60 to which are secured two outer fixed rigid members 62 and 64, and two inner resiliently movable leaves 66 and 68, biased toward each other. Outer members 62 and 64 are inner leaves 66 and 68 are joined at their lower ends, as will be more fully explained below, to provide therebetween the aforesaid enclosed passageway having the general form of a truncated pyramid, the base of the pyramid forming an entry for the textile strand. Outer fixed members 62, 64 and base 60 may be of any suitable rigid structural material, preferably steel. Outer fixed members 62 and 64 as shown may have outer surfaces 70 of generally concave cylindrical shape, adapted to conform to the outer surfaces of front roll pair 25, 26 when sensing unit 34 is in an operative position adjacent thereto as shown in FIGS. 1, 2 and 10. Fixed members 62 and 64 are secured to base 60 by screws at 49 and 50, and diminish in thickness from base portion 65 toward a top edge 72 which is formed by the intersection of cylindrical outer surface 70 and a flat inner surface 74. Fixed members 62 and 64 terminate in parallel, spaced, axially, transversely extending edges providing fixed, axially extending sliver thickness confining surfaces 74 therebetween.

Between the sliver thickness confining surfaces 74 of fixed members 62 and 64 are resilient, inwardly urged, movable spring-like inner leaf members generally designated 66 and 68, disposed generally at right angles to the outer members. Each inner leaf has a base portion 75, through which it is attached by screws 69 and 71 to base 60, and a generally flat portion 76 extending upwardly at an angle from base 60, and terminating in a vertical flat portion 78, such flat portions 78 functioning as sliver width confining surfaces movably and resiliently mounted on base 60 and being resiliently urged toward one another so that the leaves 66 and 68 are bent into displacement position in conformance with widthwise sliver mass variations while in confining abutment with the moving sliver. As seen particularly in FIGS. 9 and 10, the sliver width confining flat portions 78 of movable leaves 66 and 68 are perpendicular to the axially extending sliver thickness confining surfaces 74 and form, with said portions 74 of fixed leaves 62 and 64, a generally rectangular exit space 79 which in the embodiment of FIGS. 1 and 2 may be closely adjacent the entry to the nip of evening rolls 26 and 28 through which the sliver is passed when device 34 is in operative position, such leaves being urged outwardly against their spring forces by the presence of sliver therebetween closely to combine said sliver within exit space 79 in widthwise, axial direction at varying widths proportional to changes in sliver mass while maintaining it at constant thickness between the fixed sliver thickness confining surfaces 74. A cylindrical funnel 80 (not shown in FIG. 9) is inserted through base 60 to provide a smooth feeding surface for the sliver moving toward exit space 79 and to obviate direct contact of the sliver with inner strain gages 82 and 86, as hereinbelow described, its snagging thereon and abrasion of the gages thereby.

For measuring the position of leaf 66 and hence the mass of sliver in exit space 79, movable leaf 66 carries an inner strain gage 82 and an outer gage 84; similarly leaf 68 carries inner and outer gages 86 and 88. Such strain gages are of the resistance type, well known in the art, and are bonded to said leaves by known bonding techniques for measuring the bending and hence the displacement positions of the sliver width confining surfaces 74 of said leaves in conformance with instantaneous widthwise sliver variations as the sliver passes through exit space 79.

Referring again to FIG. 2 wherein is shown the circuit diagram and operating elements of evening mechanism 24, the four strain gages are shown arranged as a Wheatstone bridge 100. While two strain gages or even a single strain gage may be used as in FIGS. 3 through 6 hereof, the other legs of the Wheatstone bridge being fixed or variable resistors, the use of four forming a bridge effectively eliminates drift caused by variations in temperature and humidity. The bridge is designed to be adjustably in balance for a particular weight/unit length of sliver, selected for the particular sliver to be evened. When the weight/unit length deviates from the balance value, a signal is generated, and is transmitted through an isolation amplifier 102, and a phase shift network 104 to be summed in summing amplifier 108 with the input of the feedback circuit 106 of rate generator 107. A steady-state electrical bias is supplied from bias network 110. The output of amplifier 108 is sent through low-pass filter 112 to the control motor 40 to which is connected rate generator 107 and which is itself connected to drive differential mechanism 42. The change in thickness of the moving textile strand is recorded by recorder 114 is desired.

In operation, main motor 11 drives roll sets 12, 14 and 16 of draw frame 10, and drives the rear or delivery rolls of evening mechanism 24 at constant speed generally equal to or slightly less than the speed of draw frame input rolls 12; motor 11 also provides a mechanical input to differential mechanism 42 to drive evening mechanism input rolls 25, 26 at the same speed as its delivery rolls 30, 32 in the absence of a correction signal from sliver measuring device 34. Whenever the circuit of unevenness detecting device 34 produces a correction signal, the electrical and mechanical actuation means provides a physical response by acting to change the thickness of the textile strand in proportion to the correction signal. Specifically, control motor 40 operates differential mechanism 42 to vary the speed of front rolls 25, 26 to even the sliver.

The close control of the sliver within the rectangular exit opening 79 at a point closely adjacent the nip of the variable speed input rolls 25, 26 and the unique provision by the inwardly urged opposed movable leaves 66 and 68 to confine the sliver during measurement of axial width variations of the sliver while the fixed leaves 62 and 64 maintain it of constant thickness, not only provides an extraordinarily accurate measurement of sliver mass variations but also one capable of high sensitivity, in that it can measure and correct at high speed short term variations in sliver mass occurring at a rate of as high as 50 times per second (called "cycles per second") of lengths of sliver as short as 1 ½ inches in length between individual variations in mass therealong.

What is claimed is:

1. A textile fiber unevenness detecting means for measuring variations in the cross-sectional dimensions of a textile fiber comprising:
   unevenness sensing means for sensing said variations comprising
   a plurality of opposing members joined at one end so as to provide therebetween an enclosed passageway, wherein
   at least one of said members is inwardly and resiliently biased and bears adjacent said one end strain gage means responsive to the outward displacement of said member for providing an electrical signal proportional thereto,
   whereby a textile fiber strand passing through said passageway displaces the unjoined end of said member outwardly thereof against said inward resilient bias thereof in proportion to the thickness of said strand and therewith said strain gage means provides an electrical signal also proportional thereto;

fiber moving means for moving said fiber through said enclosed passageway; and electrical balancing circuit means for measuring differences from a balance value of said electrical signal and thereby measuring variations in the cross-sectional dimensions of said fiber from a predetermined value therefor.

2. A textile fiber unevenness detecting means as claimed in claim 1 wherein at least one other of said members is rigid and inflexible.

3. A textile fiber unevenness detecting means as claimed in claim 1 wherein said member is formed of resilient metal.

4. A textile fiber unevenness detecting means as claimed in claim 3 wherein said member is of sheet material.

5. A textile fiber unevenness detecting means as claimed in claim 1 wherein said strain gage means comprises a strain gage bonded to the inner surface of said member and another strain gage bonded to the opposing surface of said member.

6. A textile fiber unevenness detecting means as claimed in claim 2 wherein said opposing members form said passageway in the general form of a truncated pyramid, are joined at the base end of said pyramid and whereby said base end forms an entry for said textile strand passing through said unevenness detecting means.

7. A textile fiber unevenness detecting means as claimed in claim 6 wherein said opposing members comprise a pair of opposing inwardly and resiliently biased members and a pair of opposing rigid and inflexible members.

8. A textile fiber unevenness detecting means as claimed in claim 5 wherein said electrical balancing circuit means is connected to electrical and mechanical actuation means for providing a physical response proportional to said electrical signal.

9. A textile fiber unevenness detecting means as claimed in claim 8 wherein said electrical and mechanical actuation means provides a physical response in the form of changing the thickness of said textile strand in proportion to said electrical signal.

10. A textile fiber unevenness detecting means as claimed in claim 8 wherein said electrical and mechanical actuation means provides a record of the thickness of said textile strand.

11. A textile strand unevenness detecting means as claimed in claim 9 wherein said electrical and mechanical actuation means is located with respect to said unevenness detecting means in such manner that said changing of said thickness of said textile strand is effectable prior to its entry into said unevenness detecting means.

12. A textile strand unevenness detecting means as claimed in claim 9 wherein said electrical and mechanical actuation means is located with respect to said condensing and unevenness detecting means in such manner that said changing of said thickness of said textile strand is effectable following passage of said strand through said unevenness detecting means.

13. A textile strand unevenness detecting means as claimed in claim 9 wherein said electrical and mechanical actuation means is located with respect to said condensing and unevenness detecting means in such manner that said changing of said thickness of said textile strand is effectable within said condensing and unevenness detecting means.

14. In combination with a high speed textile drawing frame incapable of responding short term speed variations, the combination comprising a sliver unevenness detecting device cooperating with said input rolls for compressing a textile sliver while measuring variations in its widthwise dimension at constant thickness, said device having a pair of opposing sliver width confining surfaces mounted on a base, one of said sliver width confining surfaces being movably mounted on said base and resiliently urged in an inward direction toward said other confining surface to a position to confine a sliver therebetween in conformance with widthwise variations therein, and sensing and signalling means responsive to the position of said movably mounted sliver width confining surface and for providing a signal proportional to said position, and evening apparatus for continuously evening the volume of a moving multifiber strand and presenting it to said drawing frame at uniform velocity, said evening apparatus comprising an evening drafting element including a pair of delivery rolls and a pair of input rolls for evening said strand therebetween, driving means for said drafting element rolls including differential drive means having two driving inputs for driving said input rolls at variable speed, power means for driving one driving input of said differential drive means, and control means responsive to said signal from said sensing and signalling means for driving the other input of said differential drive means to vary the speed of said rolls responsive to sliver variations in accordance with said signal.

15. The combination as claimed in claim 14 wherein a flexible member is mounted on said base and resiliently urged into pressure contact with said sliver to bend said member responsive to widthwise variations in said sliver, said member having a free end and bearing said movably mounted sliver width confining surface and wherein said sensing means responsive to the position of said movably mounted sliver width confining surface comprises a strain gage mounted on said flexible member providing an electrical output signal responsive to bending of said member.

16. The combination as in claim 15 wherein said sliver width confining surfaces are each borne by one of a pair of said flexible members and said sensing means comprises two pairs of said strain gages, each pair of said strain gages being mounted on said member adjacent said base and each of said strain gages thereof being mounted on an opposing surface of each of said members.

17. In combination with a high speed textile drawing frame incapable of responding in short term speed variations, comprising the combination of a sliver unevenness detecting device cooperating with said input rolls for compressing a textile sliver while measuring variations in its widthwise dimension at constant thickness, said device having a base having attached thereto two members having outer faces with concave surfaces conforming to the curvature of said input rolls and terminating in parallel spaced, axially extending edges providing fixed axially extending sliver thickness confining surfaces therebetween, a pair of opposed flexible members mounted on said bases providing on their free ends sliver width confining surfaces between said axially extending sliver thickness confining surfaces and generally perpendicular thereto, said sliver width confining surfaces being resiliently urged toward one another to bend said members into positions in conformance with widthwise sliver variations to compress said sliver, and strain gages mounted on said flexible members providing an output signal responsive to bending of said members and to the positions of said sliver width confining surfaces, and evening apparatus for continuously evening the volume of a moving multifiber strand and presenting it to said drawing frame at uniform velocity, said evening apparatus comprising an evening drafting element including a pair of delivery rolls and a pair of input rolls for evening said strand therebetween, driving means for said drafting element rolls including differential drive means having two driving inputs for driving said input rolls at variable speed, power means for driving said delivery rolls at uniform speed and for driving one driving input of said differential drive means, and control means responsive to said strain gages for driving the other input of said differential drive means to vary the speed of said input rolls responsive to sliver variations.

18. A textile fiber unevenness detecting means for measuring variations of a textile sliver in its widthwise dimension at constant thickness, said device comprising a base having a pair of parallel, spaced, transversely extended edges providing fixed extended sliver thickness confining edges therebetween a pair of opposing sliver width confining surfaces mounted on said base, providing with said edges an enclosed passageway, one of said sliver width confining surfaces being movably mounted on said base and resiliently urged in an inward direction parallel to said surface toward said other confining surface to a position to confine a sliver therebetween in conformance with widthwise variations therein sensing means responsive to the position of said movably mounted sliver width confining surface comprising a strain gage mounted on a flexible member providing an electrical output signal responsive to bending of said member and electrical balancing circuit means for measuring differences from a balance value of said electrical signal and thereby measuring variations in the widthwise dimension of said sliver from a predetermined value therefor.

* * * * *